US008560942B2

(12) United States Patent
Fortes et al.

(10) Patent No.: US 8,560,942 B2
(45) Date of Patent: Oct. 15, 2013

(54) DETERMINING DOCUMENT LAYOUT BETWEEN DIFFERENT VIEWS

(75) Inventors: Filipe Fortes, Seattle, WA (US);
Gregory A. Hermann, Renton, WA (US); Grzegorz Andrzej Zygmunt, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1859 days.

(21) Appl. No.: 11/303,202

(22) Filed: Dec. 15, 2005

(65) Prior Publication Data
US 2007/0143668 A1 Jun. 21, 2007

(51) Int. Cl.
*G06F 17/00* (2006.01)

(52) U.S. Cl.
USPC ........... 715/238; 715/243; 715/246; 715/252; 715/273

(58) Field of Classification Search
USPC ............................ 715/243, 238, 246, 252, 273
See application file for complete search history.

(56) References Cited

U.S. PATENT DOCUMENTS

| | | | | |
|---|---|---|---|---|
| 5,553,217 A | * | 9/1996 | Hart et al. | 715/210 |
| 5,640,579 A | * | 6/1997 | Koppolu et al. | 715/209 |
| 6,025,841 A | * | 2/2000 | Finkelstein et al. | 715/803 |
| 6,215,490 B1 | * | 4/2001 | Kaply | 715/788 |
| 7,499,913 B2 | * | 3/2009 | Kraft et al. | 707/3 |
| 2003/0189598 A1 | * | 10/2003 | Lipstein et al. | 345/781 |
| 2004/0139400 A1 | * | 7/2004 | Allam et al. | 715/526 |
| 2006/0007466 A1 | * | 1/2006 | Ben-Yehuda et al. | 358/1.13 |
| 2007/0094607 A1 | * | 4/2007 | Morgan et al. | 715/762 |

OTHER PUBLICATIONS

Marshall, et al., "Spatial Hypertext: Designing for Change" Aug. 1995, Communications of the ACM, p. 88-97.*
Chang, et al., "A Negotiation Architecture for Fluid Documents", UIST '98, San Francisco, CA, copyright 1998, ACM, p. 123-132.*

* cited by examiner

*Primary Examiner* — Amelia Rutledge
(74) *Attorney, Agent, or Firm* — Merchant & Gould

(57) ABSTRACT

Determining document layout between different views is disclosed. The content of the document is reformatted between layouts while user experience elements are persisted between views. In general, a user may switch between document views. An anchor point for a first view is identified and the anchor point is mapped to the content of the new view. The anchor point is positioned in the new view to allow a smooth user transition between views. Zooming ratios and selections may be persisted between views to create continuity between views. Objects may be reformatted between views to best fit the view.

19 Claims, 6 Drawing Sheets

DETERMINING DOCUMENT LAYOUT BETWEEN DIFFERENT VIEWS

BACKGROUND

When viewing a computer document, users typically only have the choice of switching between window sizes associate with a document. Typically, changing a window size changes a viewable area, but has no affect on the users perception of the document. Stated another way, when switching a window size, the content of the document is not reformatted to accommodate a changed view. The user perceives the same layout regardless of the window size.

SUMMARY

This Summary is provided to introduce a selection of concepts in a simplified form that are further described below in the Detailed Description. This Summary is not intended to identify key features or essential features of the claimed subject matter. Also, this Summary is not intended for use as an aid in determining the scope of the claimed subject matter.

Determining document layout between different views is disclosed. In general, a user may switch between document views. The content of the document is reformatted between layouts. An anchor point for a first view is identified and the identified anchor point is mapped to associated content of the new view. The anchor point may be positioned in the new view to allow a smooth user transition between views. Zooming ratios and selections may be persisted between views to create continuity between views. Also, objects may be reformatted between views to best fit the view.

In this manner, aspects of the disclosure allow the content layout of a document to change between views. By providing dynamic content layout between views, a user is provided a seamless user experience when switching between views. Also, aspects of the disclosure allow switching between views while facilitating user expectations for content layout in the new view.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Illustrative Embodiments for Determining Document Layout Between Different Views Determining document layout between different views may include reformatting content of the document between layouts. Although not limited to any type of view, in one aspect, the different views may include a 1-page view, a 2-page view, and /or a scroll view. In general, a user may decide to switch between document views. The content of the document may be reformatted between views. Aspects of the disclosure include identifying an anchor point for a current view and positioning the anchor point of the current view in the new view to allow a reader a smooth user experience between views.

In this manner, the content layout of a document is allowed to change between views. By providing dynamic content layout between views, a user is provided a seamless user experience when switching between views. Also, aspects of the disclosure allow switching between views while facilitating user expectations for content layout in the new view.

Figure 1:
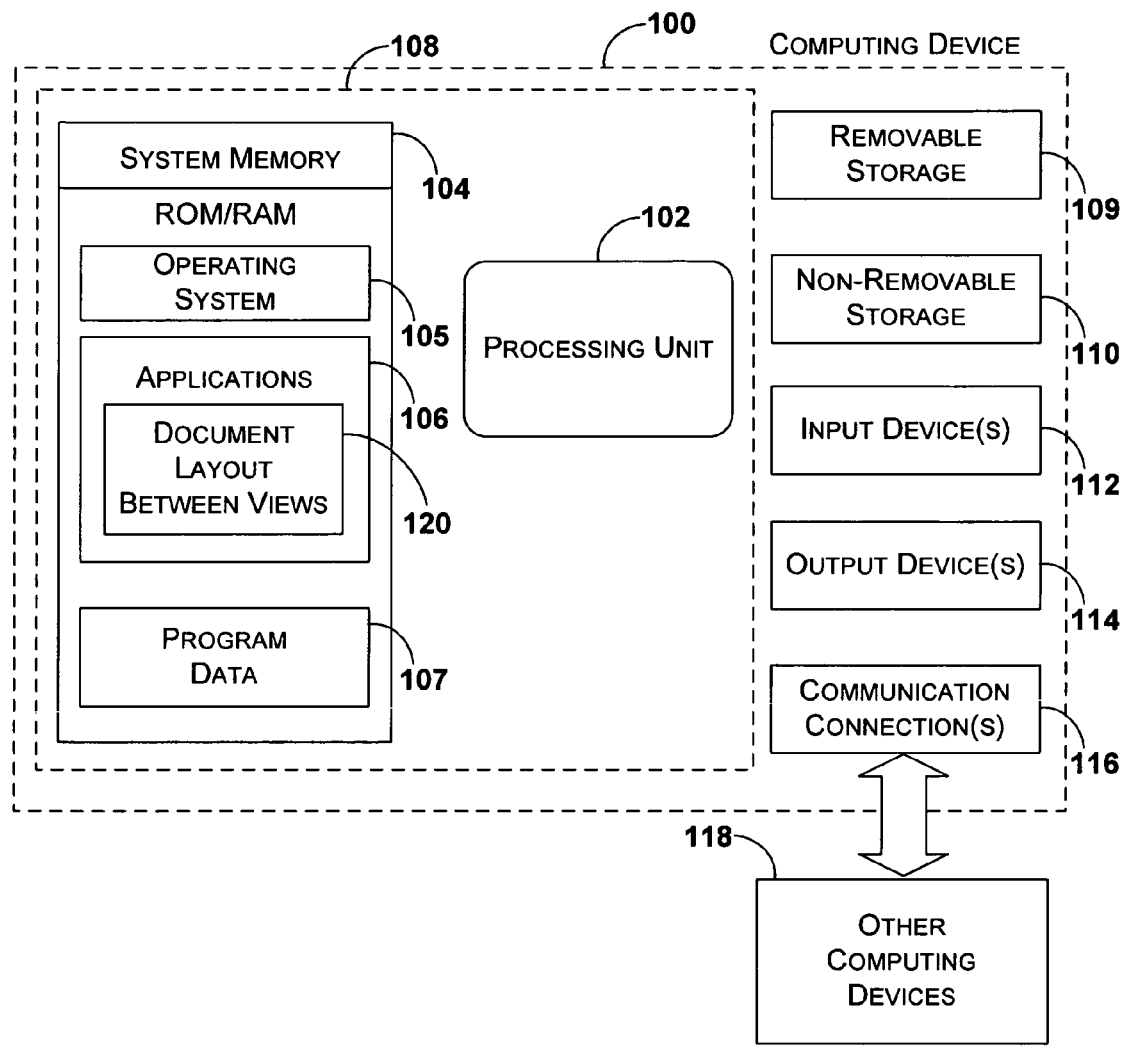
FIG. 1 illustrates an exemplary computing device that may be used in one aspect of the present invention.
Figure 2:
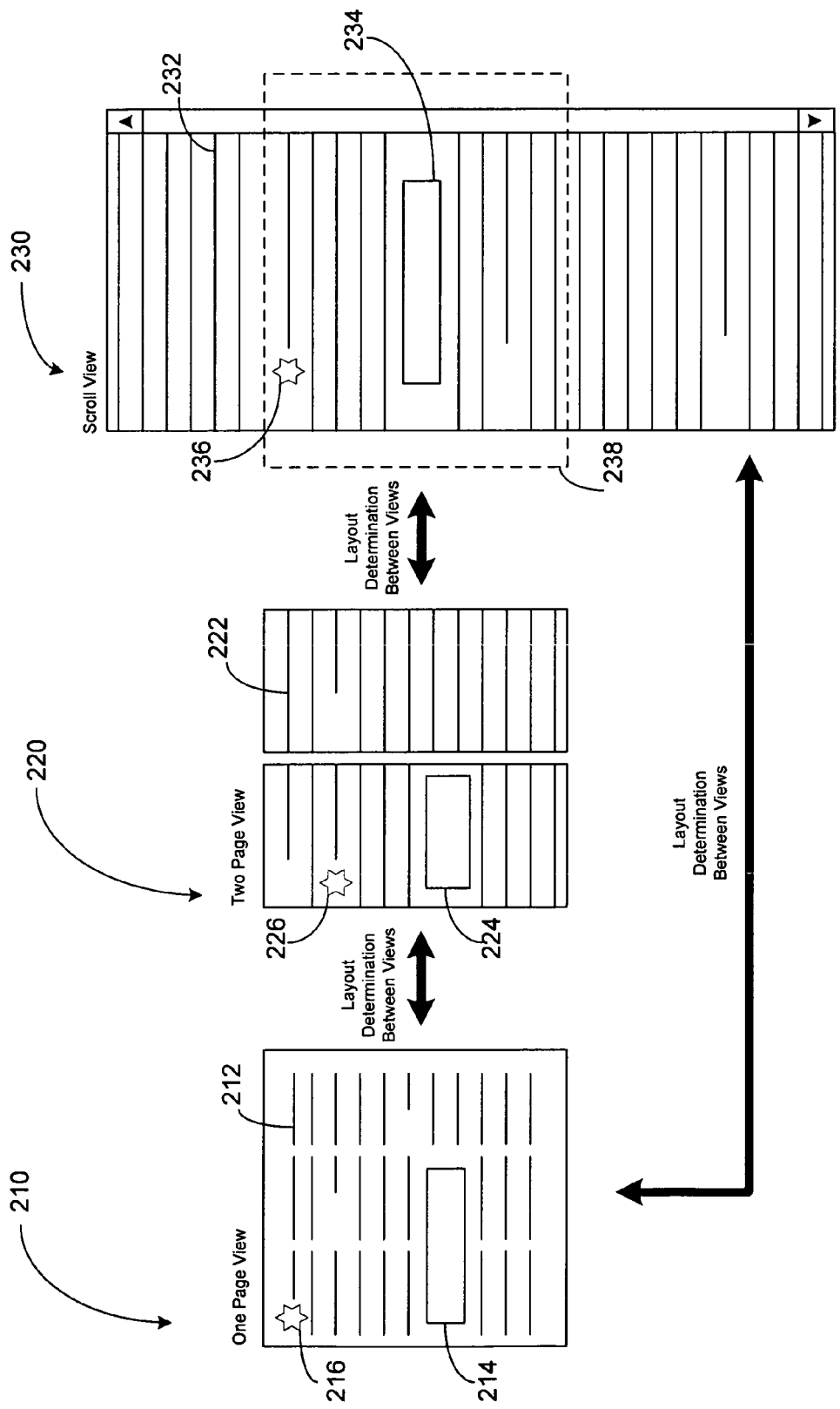
FIG. 2 represents one exemplary system overview for a few aspects of determining document layout between different views.

FIG. 2 represents one exemplary system overview 200 for determining document layout between different views. Even though the disclosure herein exemplifies a one-page view, two-page view, and a scroll view, the disclosure should not be limited to such views. Any type of view may be associated as further set forth herein. System 200 may include one-page view 210, two-page view 220, and/or scroll view 230. Views 210, 220, and 230 may be facilitated by a combination of software and hardware elements, an operating, system or any combination thereof. Hardware, databases, software or applications for facilitating views 210, 220 and 230 may be integrated as a single element or include various elements in communication with one another. Hardware, databases, software and/or applications for facilitating views 210, 220 and 230 may be associated with computing device 100 as exemplified in FIG. 1.

In FIG. 2, system 200 may include one-page view 210, two-page view 220, and/or scroll view 230. Views 210, 220, and 230 may include any type of application for producing a document. For example, views 210, 220 and 230 may be associated with MICROSOFT WORD, MICROSOFT EXCEL, MICROSOFT POWERPOINT, and/or MICROSOFT WORD ART of MICROSOFT CORPORATION headquartered in Redmond, Wash. In general, views 210, 220 and 230 may include and/or be associated with any type of program that includes data entry.

One-page view 210 may include data 212. Data 212 may include text in a one-page layout. The one-page layout may include text formatted in a single column, double columns, multiple columns, or any other format conducive to a one-page layout. One-page view 210 may also include an object 214. Object 214 may include a text block, graphic, chart, figure, picture, animation, and/or any other type of object that floats in a document. As an example depicted in FIG. 2, object 214 is sized to span two columns in one-page view 210. One-page view 210 may further include anchor point 216. Anchor point 216 is graphically represented in FIG. 2 by a star. Anchor point 216 is a point in the document where a user would naturally begin interpreting the document. Anchor point 216 is a content reference point for the document. For example, in a one-page view, an anchor point for an English document may be the top left corner. The anchor point may be positioned elsewhere in one-page view 210 depending on the language of the document, reading custom, and/or purpose of the document.

Two-page view 220 may include two document pages formatted adjacent one another. As one example of a two-page view, the pages of the view may include a layout similar to a book. A user may then flip the pages of the view similar to a book. Two-page view 220 may include data 222 similar to the data described above in association with one-page view 210. In the situation where a user, switches from a one-page view to a two-page view, data 222 may include the same data of the one-page view formatted for a two-page view. Two-page view 220 may also include object 224. Object 224 may include a text block, graphic, chart, figure, picture, animation, and/or any other type of object that floats in a document. As an example depicted in FIG. 2, object 224 is sized to span one of the pages in two-page view 220. Object 224 illustrates one example associated with system 200. In the situation where a user switches from a one-page view to a two-page view, object 224 may be resized to fit a single page in the two-page view 220.

Two-page view 220 may further include anchor point 226. Anchor point 226 is graphically represented in FIG. 2 by a star. Anchor point 226 represents the anchor point when a user switches from a one-page view to a two-page view. Anchor point 226 may be positioned proximal the upper portion of the left hand page of the two-page view. Depending on the layout of the document, anchor point 226 may not be in the top left-hand corner. In the situation where the two-page view is the initial document view, anchor point 226 may be a point in the document where a user would naturally begin interpreting the document. For example, in a two-page view, an anchor point for an English document may be the top left corner of the left page. The anchor point may be position elsewhere in two-page view 220 depending on the language of the document, reading custom, and/or purpose of the document.

Scroll view 230 may include a single document where a user is allowed to scroll up and down the document. Dashed line 238 represents the viewing window of scroll view 230. As one example of a scroll view, a user may use up and down arrows to move the document accordingly as the user reads the document. Scroll view 230 may include data 232 similar to the data described above in association with one-page view 210. In the situation where a user switches from a one-page view to a scroll view, data 232 may include the same data of the one-page view formatted for a scroll view. Scroll view 230 may also include an object 234. Object 234 may include a text block, graphic, chart, figure, picture, animation, and/or any other type of object that floats in a document. As depicted in FIG. 2, object 234 is sized to span the width of the scroll area. Object 234 illustrates one example associated with system 200. In the situation where a user switches from a one-page view to a scroll view, object 234 may be resized to fit scroll view 230.

Scroll view 230 may further include anchor point 236. Anchor point 236 is graphically represented in FIG. 2 by a star. Anchor point 236 represents the anchor point when a user switches from a one-page view to a two-page view. Anchor point 236 may be positioned proximal to the upper portion of the view window. Depending on the layout of the document, anchor point 236 may not be in the top left-hand corner. In the situation where the scroll view is the initial document view, anchor point 236 may be a point in the document where a user would naturally begin interpreting the document. For example, in a scroll view, an anchor point for an English document may be the top left corner of the view window. The anchor point may be position elsewhere in scroll view 230 depending on the language of the document, reading custom, and/or purpose of the document.

As one general example, a user may open a document in a first view, such as a one-page view. A user may then decide to switch from a one-page view to a second view, such as a two-page view. In one aspect, an anchor point is determined for the content of the initial layout. The content of the document is then reformatted for the two-page view. The second view of the document is such that the anchor point is positioned at a point associated with user expectancy of the content. For example, the anchor point in an initial view may be the first words a user encounters, such as the words "hello world". When the user switches views, the words "hello world" may be positioned at a point in the second view so that the user may easily find the position in the second view. Also, when a user switches views, the zoom ratio of the document and any selections made in the document may persist to the new view and the new content layout. In other aspects, objects may be reformatted to best fit a view. Even though the examples pertain to switching from a one-page view to a two-page view, aspects of the disclosure include switching between any document view types.

In this manner, the content layout of a document may change between views. By providing dynamic content layout between views, a user is provided a seamless user experience when switching between views. Also, aspects of the disclosure allow switching between views while facilitating user expectations for content layout in the new view.

Figure 3:
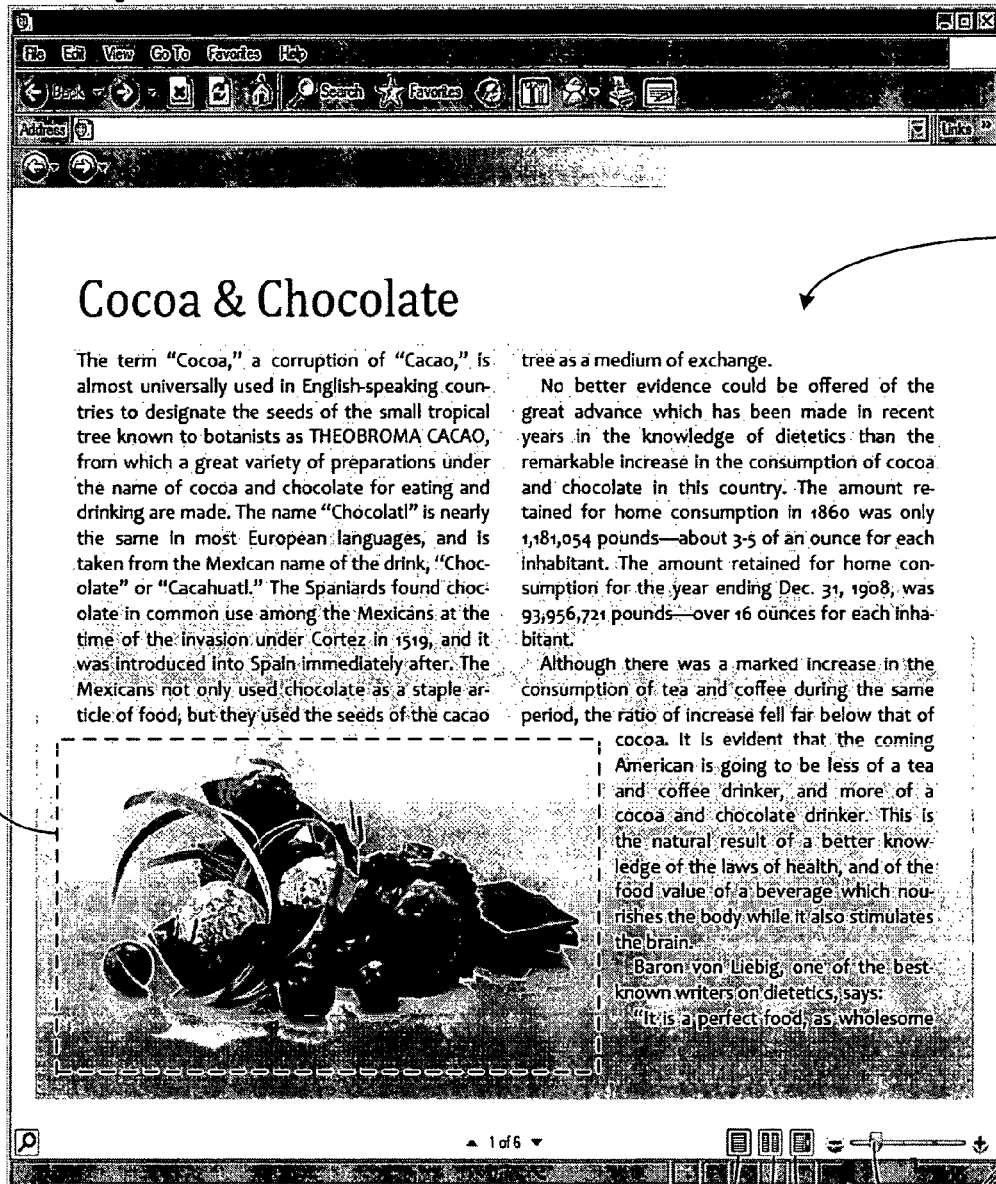
FIG. 3 represents one exemplary screen shot representing a few aspects of a one-page view.

FIG. 3 is an exemplary screen shot representing a one-page view 300. Exemplary one-page view may include a document that includes text 302 and object 304. In this example, text 302 includes two columns of text and object 304 includes a photograph. One-page view 300 may also include a set of controls, such as one-page control 306, two-page control 308, scroll control 310 and zoom control 312. One-page control 306 is a control for actuating a one-page view. When a user desires viewing the document in a one-page view, the one-page control 306 may be selected. Likewise, two-page control 308 is a control for actuating a two-page view and scroll control 310 is a control for actuating a scroll view. Zoom control 312 is a control for changing the level of zoom associated with the document.

Figure 4:
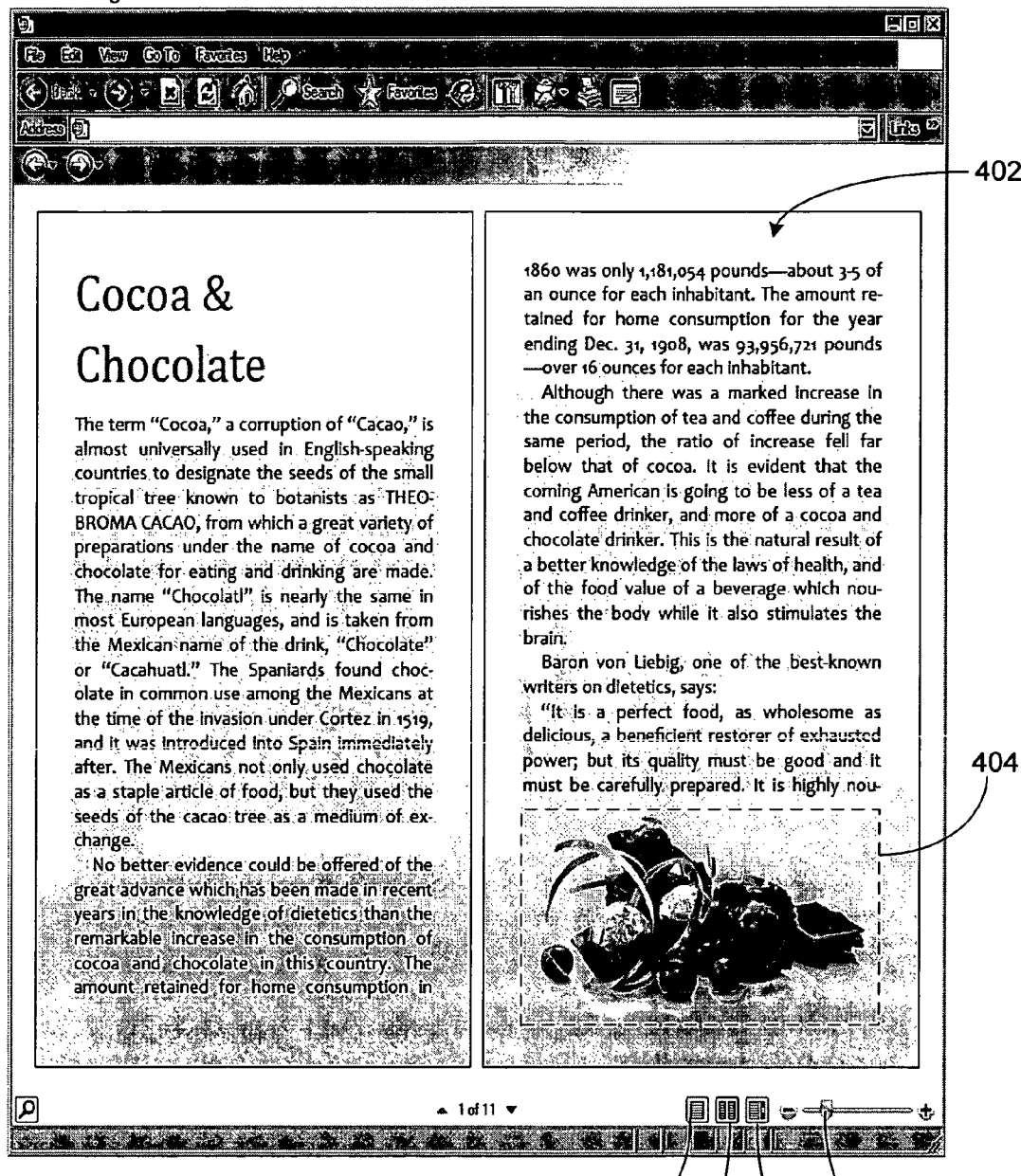
FIG. 4 represents one exemplary screen shot representing a few aspects of a two-page view.

FIG. 4 is an exemplary screen shot representing a two-page view 400. Two-page view 400 is a two-page view of data associated with one-page view 300. Exemplary two-page view may include a document that includes text 402 and object 404. In this example, text 402 includes two pages of text and object 404 includes a photograph. Two-page view 400 may also include a set of controls, such as one-page control 406, two-page control 408, scroll control 410 and zoom control 412. One-page control 406 is a control for actuating a one-page view. When a user desires viewing the document in a one-page view, the one-page control 406 may be selected. Likewise, two-page control 408 is a control for actuating a two-page view and scroll control 310 is a control for actuating a scroll view. Zoom control 312 is a control for changing the level of zoom associated with the document.

Figure 5:
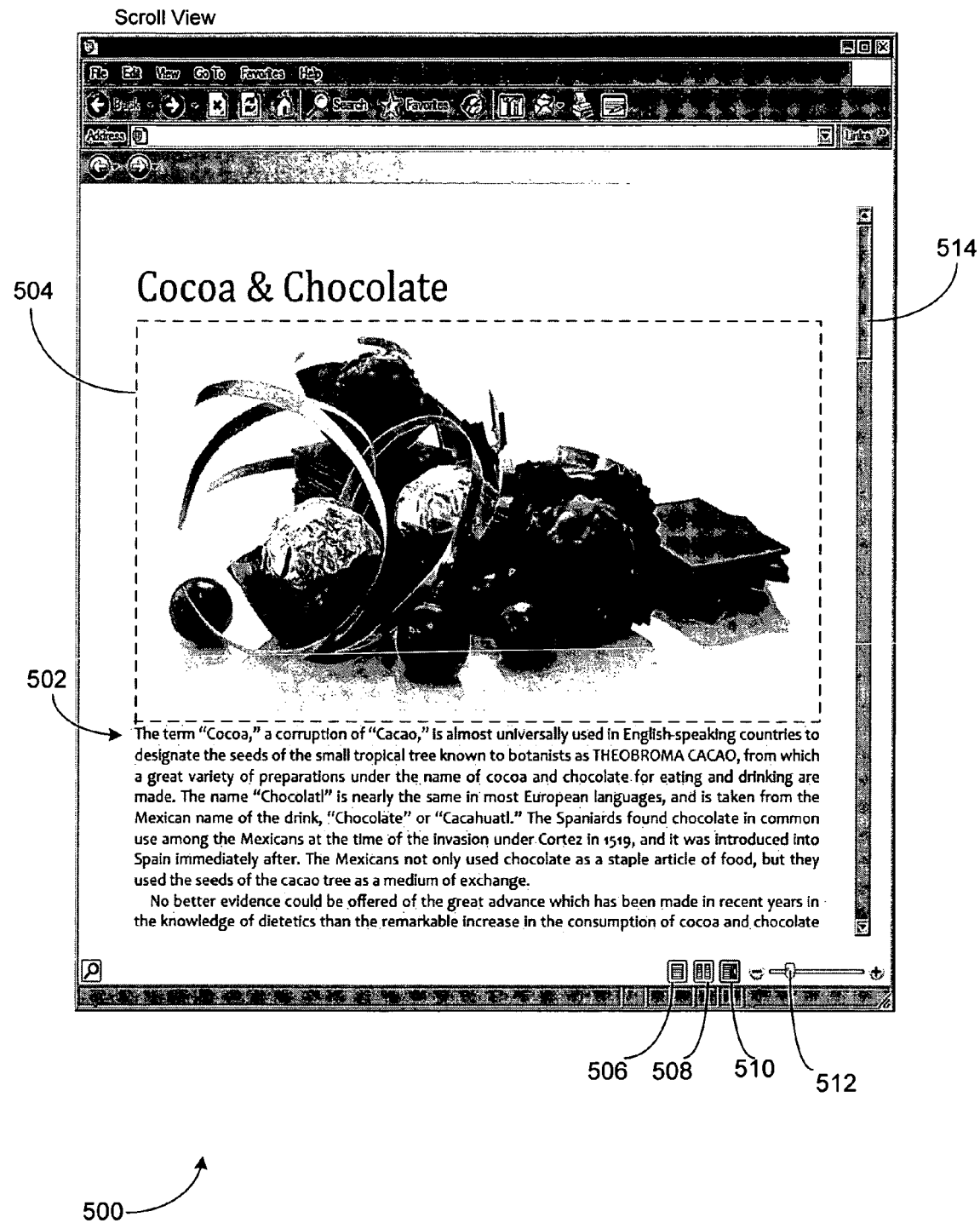
FIG. 5 represents one exemplary screen shot representing a few aspects of a scroll view.

FIG. 5 is an exemplary screen shot representing a scroll view 500. Scroll view 500 is a scroll view of data associated with one-page view 300. Exemplary scroll view may include a document that includes text 502 and object 504. In this example, text 502 includes a scroll of text and object 504 includes a photograph. Scroll view 500 may also include a set of controls, such as one-page control 506, two-page control 508, scroll control 510 and zoom control 512. One-page control 506 is a control for actuating a one-page view. When a user desires viewing the document in a one-page view, the one-page control 506 may be selected. Likewise, two-page control 508 is a control for actuating a two-page view and scroll control 510 is a control for actuating a scroll view. Zoom control 312 is a control for changing the level of zoom associated with the document. Scroll view 500 may also include scroll bar 514 for moving the document within the viewing window.

Figure 6:
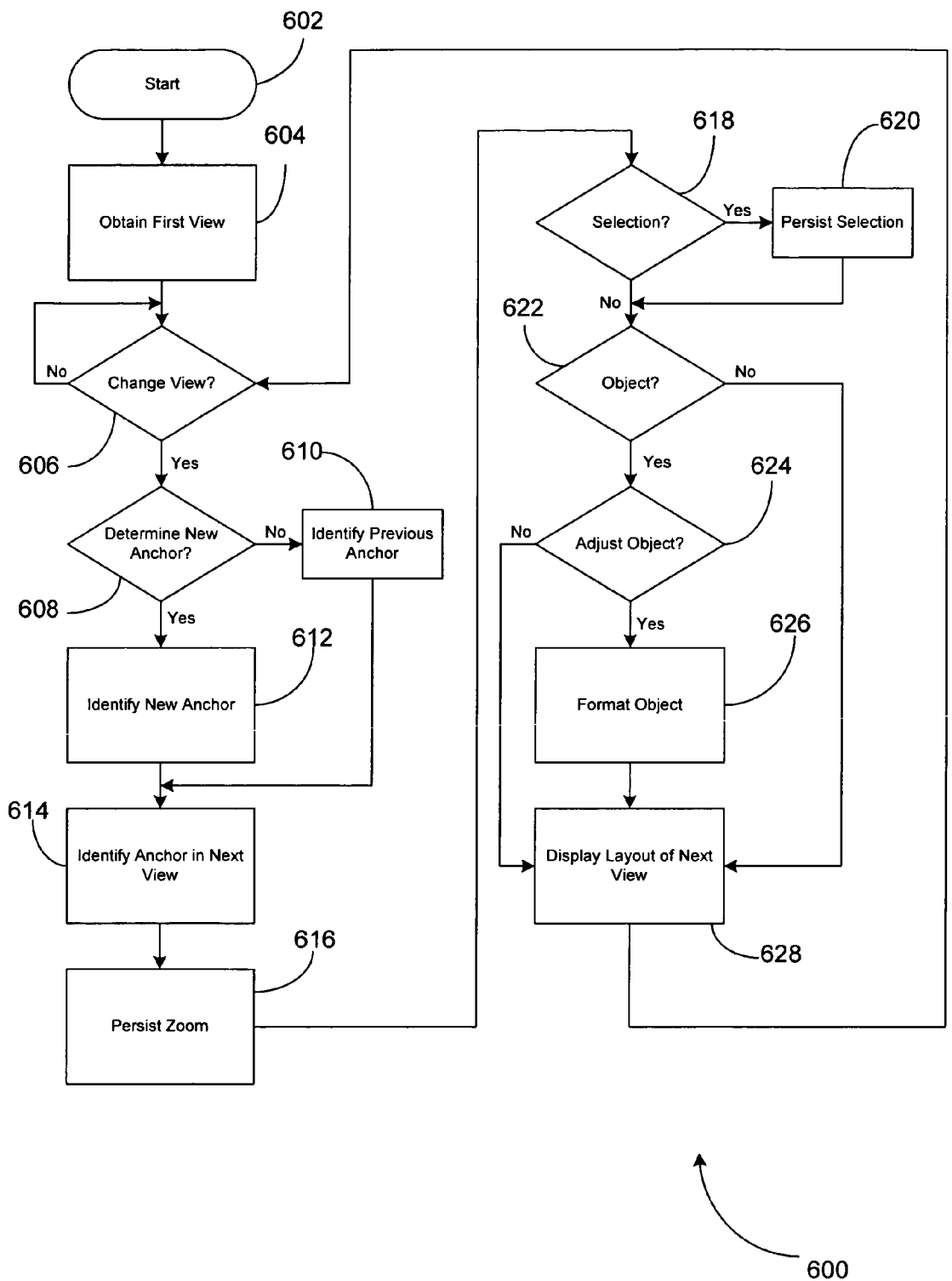
FIG. 6 is an operational flow diagram representing an exemplary embodiment for determining document layout between different views.

FIG. 6 is an operational flow diagram representing an exemplary embodiment for determining document layout between different views. Operational flow 600 begins at start operation 602 and flows to operation 604. At operation 604, a user may obtain first view of a document. For example, a user may open a document in a view. A document may have a first view that is predetermined by a page designer. A user may obtain a first view of a document in any manner for opening a document.

Operational flow 600 continues to decision operation 606. At decision operation 606, it is determined whether to change views. For example, a user may obtain a first view of a document in a one-page view and decide to change views to a two-page view. When it is decided not to change views, operational flow 600 loops back until it is decided to change views.

When it is decided to change views, operational flow 600 continues to decision operation 608 where it is decided whether to determine a new anchor. Operational flow 600 continues to operation 610 when a new anchor is not determined. At operation 610, the previous anchor is identified. The previous anchor is identified in the situation where a user "toggles" between views. By identifying the previous anchor point during toggling the document does not creep to the beginning of the document as the user switches views. As an example, a user may open a document in a one-page view. The anchor point may be associated with the elements in the top left corner of the one-page view. The user may then decide to switch to a two-page view. In the two-page view, the elements associated with the anchor may be located in the middle of the left hand page. If the user decides to "toggle" back to the one-page view, a new anchor point in the two-page view may not be determined (previous anchor point used). In this manner, the user switches back to the one-page view with the same content layout as initially viewed before toggling to the two-page view.

As an example of the alternative, if a new anchor point is determined during toggling, the new anchor point would be in the top left corner of the left hand page of the two-page view. When the user switches to the one-page view, the content would creep upwardly. Such document creeping may be undesirable in some situations. Accordingly, the first view may be cached so a user can toggle between views without the content creeping upwardly as toggling.

From operation 610, operational flow 600 continues as more fully set forth below. If, at decision operation 608 a new anchor is determined, operational flow 600 continues to operation 612. A new anchor is determined when a first view is obtained. For example, a new anchor is determined when a user opens a document. A new anchor may also be determined when it is indicated that the user is not toggling between views. For example, a new anchor may be determined when a user switches pages in a view. As another example, a new anchor may be determined when a user scrolls a document in a scroll view. Succinctly stated, a new anchor may be determined when a user is not toggling between different views.

At operation 612, the new anchor is identified. The new anchor may include an element of the content of the document. For example, the anchor point may include content associated with a position in the document. Operational flow 600 continues to operation 614, where the anchor is identified in the nest view. The anchor may be a previous anchor or a new anchor. The anchor may be identified by comparing document content between views. As another aspect, an anchor in the next view may be associated with a marker, so that a user can easily find the anchor the marker may include a highlight, a pointer, a color, a fading marker, and/or any other type of marker for marking a pint in a document. For example, the first sentence in a first view may be "see spot run". The anchor may be associated with this sentence since it is the point where a user would naturally start interpreting the document. When the views are changed, the sentence "see spot run" may no longer be the first sentence of the changed view. In order to facilitate an easy transition for the user between views, the sentence "see spot run" may be marked so a user may determine where the content of the prior view begins in the new view.

At operation 616, the zoom may be persisted between the first view and the next view. For example, a user may be viewing a document at 150% zoom in a first view. When the user decides to change views, the changed view is at a 150% zoom. Operational flow 600 continues to decision operation 618, at decision operation 618, it is determined whether a selection is made in the first view. When a selection is made, operational flow 600 continues to operation 620, where the selection is persisted to the next view. For example, while in a first view, a user may highlight a portion of text. When the user changes views, the highlighted text is persisted to the next view having the new content layout.

At decision operation 622, it is determined whether an object exists in the document. If an object does not exist in the document, operational flow 600 continues to operation 628 as indicated in FIG. 6. If an object does exist in the document, operational flow 600 continues to decision operation 624. At decision operation 624, it is determined whether the object needs adjusting between views. For example, the size of an object may need to be adjusted when the content layout is changed between views. When the object does not need adjusting, operational flow 600 continues to operation 628 as indicated below. When the object needs adjusting, operational flow 600 continues to operation 626. At operation 626, the object is formatted for the new view. For example, in a one-page view, an object may span the width of a page. In the situation where a user switches to a two-page view, one or more dimensions of the object may be modified to fit one of the two pages of the two-page view.

Operational flow 600 continues to operation 628 where the layout of the changed view is displayed to the user. Operational flow 600 then loops back to decision operation 606, where it is determined whether to change views. In this manner, aspects of the disclosure allow the content layout of a document to change between views. By providing dynamic content layout between views, a user is provided a seamless user experience when switching between views. Also, aspects of the disclosure allow switching between views while facilitating user expectations for content layout in the changed view.

Illustrative Operating Environment

Referring to FIG. 1, an exemplary system for implementing the invention includes a computing device, such as computing device 100. In a basic configuration, computing device 100 may include a stationary computing device or a mobile computing device. Computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include application 120 for determining document layout between different views. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included.

Computing device 100 also contains communication connection(s) 116 that allow the device to communicate with other computing devices 118, such as over a network or a wireless network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for determining document layout between views, the method comprising:
    obtaining a document having displayed content including an object formatted for a first view within a window that is one of a type of view comprising: a one-page view of the displayed content that spans the display of the object across two columns, a two-page view of the displayed content that spans the display of the object across one page, and a scroll view of the displayed content that spans the display of the object across a width of the scroll view;
    causing a computer processor to determine an anchor point that is based in part on the type of the view and a language of the content of the document and a zoom magnification for the displayed content of the first view, wherein the anchor point anchors a beginning portion of the displayed content that is being displayed in the first view;
    reformatting the displayed content of the first view of the document for a second view within the window that is a different type of view from the first view and is one of a type of view comprising: the one-page view of the displayed content that spans the display of the object across two columns, the two-page view of the displayed content that spans the display of the object across one page, and the scroll view of the displayed content that spans the display of the object across the width of the scroll view;
    identifying the determined anchor point of the displayed content to determine the beginning portion of the displayed content; and
    displaying the reformatted displayed content in the second view in place of the first view within the window, wherein the anchored beginning portion of the displayed content is displayed at the beginning portion of the second view, and wherein the zoom magnification selected for the displayed content of the first view is persisted to the displayed content of the second view.

2. The computer-implemented method of claim 1, wherein when the second view is switched back to the first view a same content layout as an initial view of the first view is used.

3. The computer-implemented method of claim 1, further comprising caching the first view such that when the second view is switched back to the first view the cached content is displayed.

4. The computer-implemented method of claim 1, wherein the anchor point is a new anchor point.

5. The computer-implemented method of claim 4, wherein the new anchor point is determined when the first view is an initial view.

6. The computer-implemented method of claim 4, wherein the new anchor point is determined when a page is switched in the first view.

7. The computer-implemented method of claim 1, wherein the anchor point is a previous anchor point.

8. The computer-implemented method of claim 7, wherein the previous anchor point is determined when views are toggled.

9. The computer-implemented method of claim 1, further comprising:

determining whether a content selection is displayed on the displayed content of the first view; and persisting the display of the selection from the displayed content of the first view to the displayed content of the second view, when a selection is displayed with the first view.

10. The computer-implemented method of claim 1, further comprising:

determining whether to format the object; and formatting the object for the second view.

11. The computer-implemented method of claim 1, wherein displaying the second view includes displaying a marker in the displayed content that is identified by the anchor point.

12. A computer-readable storage medium having computer-executable instructions for determining document layout between views, the instructions comprising:

obtaining document content having displayed content formatted for a first view within a window that is one of a type of view comprising: a one-page view of the displayed content, a two-page view of the displayed content, and a scroll view of the displayed content;

determining a new anchor point for a beginning portion of the document content being displayed within the first view when at least one of: the first view is an initial view, and a page is navigated in the first view;

determining a zoom of the displayed content formatted for the first view;

determining a previous anchor point for a beginning portion of the document content being displayed within the first view when views are toggled;

identifying, in a second view within the window that is a different type of view from the first view and is one of a type of view comprising: the one-page view of the displayed content, the two-page view of the displayed content, and the scroll view of the displayed content, at least one of the new anchor point, and the previous anchor point; and replacing the display of the first view within the window by displaying the displayed content in the second view in the window, wherein the second view includes the beginning portion of the document content anchored according to at least one of: the new anchor point, and the previous anchor point, and wherein the zoom of the displayed content formatted for the first view is persisted to the displayed content of the second view.

13. The computer-readable storage medium of claim 12, wherein when the second view is switched back to the first view a same content layout as an initial view of the first view is used.

14. The computer-readable storage medium of claim 12, further comprising caching the first view such that when the second view is switched back to the first view the cached content is displayed.

15. The computer-readable storage medium of claim 12, further comprising:

determining whether a content selection is displayed on the displayed content of the first view;

persisting the display of the selection from the displayed content of the first view to the second view displayed content of the when a selection is displayed with the first view;

determining whether an object is displayed in the display content of the first view;

determining whether to format the object when the object is displayed in the display content of the first view; and formatting the object for the second view when determining to format the object.

16. The computer-readable storage medium of claim 12, wherein displaying the second view includes displaying a marker in the displayed content that is identified by the anchor point.

17. A system for determining document layout between views, the system comprising:

a processor; and a memory having computer executable instructions stored thereon, wherein the computer executable instructions are configured for:

obtaining a document having content formatted for a first view, wherein a portion of the content is currently displayed in a first view window;

determining an anchor point for the portion of the content that is currently displayed in the first view window, wherein the anchor point anchors a beginning of the content that is being currently displayed in the first view window;

determining a zoom magnification of the content currently displayed in the first view window;

reformatting the document to have the content formatted for a second view that is a different type of view as compared to the first view;

identifying the determined anchor point for the portion of the content that was currently displayed in the first view window to determine the beginning of the content that was being currently displayed in the first view window;

removing the display of the first view; and displaying the reformatted document in a second view within the first view window, wherein the anchored beginning portion of the content that was currently displayed at the beginning portion of the first view window is displayed at the beginning portion of the second view window, and wherein the zoom magnification of the content that was currently displayed in the first view window is persisted to the content formatted for the second view.

18. The system of claim 17, wherein when the second view is switched back to the first view a same content layout as an initial view of the first view is used.

19. The system of claim 17, further comprising caching the first view such that when the second view is switched back to the first view the cached content is displayed.

* * * * *